United States Patent
Yamamoto et al.

(10) Patent No.: US 9,782,941 B2
(45) Date of Patent: Oct. 10, 2017

(54) POLARIZED PLASTIC LENS FOR SPECTACLES AND METHOD FOR MANUFACTURING POLARIZED PLASTIC LENS FOR SPECTACLES

(71) Applicant: EHS LENS PHILIPPINES INC., General Trias, Cavite (PH)

(72) Inventors: Akinori Yamamoto, Suwa (JP); Masaki Ihara, Suwa (JP); Daisuke Ogaya, Suwa (JP); Kenichi Tonouchi, Suwa (JP)

(73) Assignee: EHS LENS PHILIPPINES INC., Cavite (PH)

( * ) Notice: Subject to any disclaimer, the term of this patent is extended or adjusted under 35 U.S.C. 154(b) by 518 days.

(21) Appl. No.: 14/377,351

(22) PCT Filed: Jan. 25, 2013

(86) PCT No.: PCT/JP2013/000404
§ 371 (c)(1),
(2) Date: Aug. 7, 2014

(87) PCT Pub. No.: WO2013/118444
PCT Pub. Date: Aug. 15, 2013

(65) Prior Publication Data
US 2015/0158259 A1    Jun. 11, 2015

(30) Foreign Application Priority Data
Feb. 7, 2012  (JP) .................. 2012-024252

(51) Int. Cl.
*B29D 11/00* (2006.01)
*G02C 7/12* (2006.01)
(Continued)

(52) U.S. Cl.
CPC ........ *B29D 11/00403* (2013.01); *B29C 39/24* (2013.01); *B29C 39/26* (2013.01);
(Continued)

(58) Field of Classification Search
None
See application file for complete search history.

(56) References Cited

U.S. PATENT DOCUMENTS

| 4,090,830 A | 5/1978 | Laliberte |
| 2003/0214080 A1* | 11/2003 | Maki ...................... B29C 45/73 |
| | | 351/159.74 |

(Continued)

FOREIGN PATENT DOCUMENTS

| CN | 101910892 A | 12/2010 |
| JP | 63184816 A | 7/1988 |

(Continued)

OTHER PUBLICATIONS

International Search Report issued in International Patent Application No. PCT/JP2013/000404 dated Feb. 26, 2013.

(Continued)

*Primary Examiner* — Matthew Daniels
*Assistant Examiner* — Kimberly A Stewart
(74) *Attorney, Agent, or Firm* — Oliff PLC

(57) ABSTRACT

There is provided a polarized plastic lens for spectacles configured to be thin having almost the same thickness as the thickness of a normal plastic lens for spectacles, and a method for manufacturing the polarized plastic lens for spectacles, the plastic lens including a first lens base material having an object-side surface; a second lens base material having an eyeball-side surface; and a polarized film provided between the first lens base material and the second lens base material so that a minimum value of a distance between the polarized film and the object-side surface is 0.3 mm or more and 0.7 mm or less.

8 Claims, 8 Drawing Sheets

(51) Int. Cl.
  *G02B 5/30* (2006.01)
  *B29C 39/24* (2006.01)
  *B29C 39/26* (2006.01)

(52) U.S. Cl.
  CPC .... *B29D 11/0073* (2013.01); *B29D 11/00644* (2013.01); *G02B 5/305* (2013.01); *G02C 7/12* (2013.01); *G02C 2202/16* (2013.01)

(56) References Cited

U.S. PATENT DOCUMENTS

| | | | |
|---|---|---|---|
| 2005/0213032 A1* | 9/2005 | Delery | B29D 11/00932 351/178 |
| 2009/0079934 A1* | 3/2009 | Su | B29D 11/0073 351/159.56 |
| 2009/0091825 A1 | 4/2009 | Saito et al. | |
| 2009/0201584 A1* | 8/2009 | Ryu | G02B 1/08 359/485.01 |
| 2010/0033675 A1* | 2/2010 | Miyoshi | B29D 11/00634 351/159.62 |

FOREIGN PATENT DOCUMENTS

| | | |
|---|---|---|
| JP | A-2001-311804 | 11/2001 |
| JP | 2003154555 A | 5/2003 |
| JP | A-2007-316595 | 12/2007 |
| JP | 2009-003303 A | 1/2009 |
| WO | WO 2010/114023 A1 | 10/2010 |

OTHER PUBLICATIONS

Written Opinion of the International Searching Authority issued in International Patent Application No. PCT/JP2013/000404 dated Feb. 26, 2013.

Sep. 16, 2015 Extended Search Report issued in European Patent Application No. 13746050.7.

* cited by examiner

FIG.1
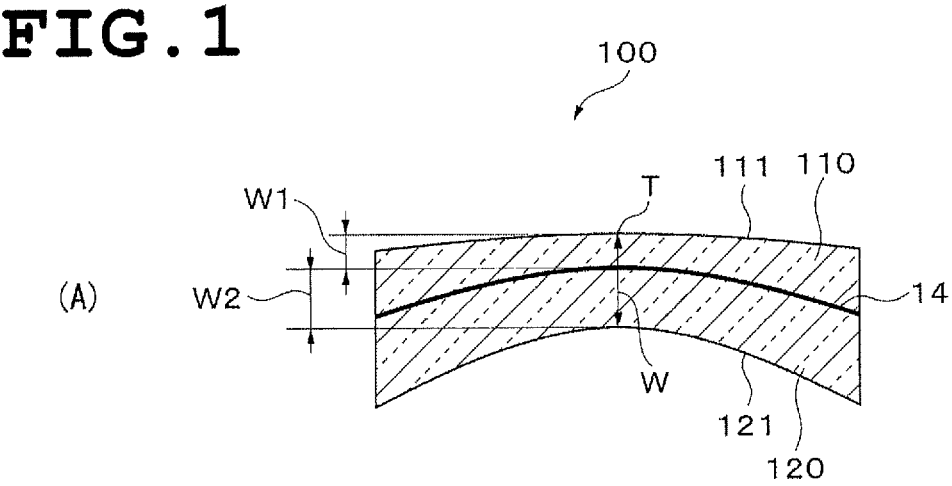
(A)
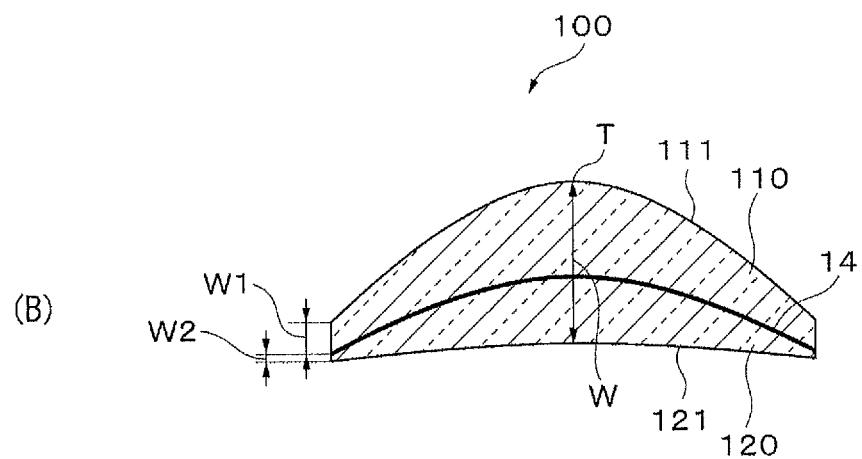
(B)

POLARIZED PLASTIC LENS FOR SPECTACLES AND METHOD FOR MANUFACTURING POLARIZED PLASTIC LENS FOR SPECTACLES

TECHNICAL FIELD

The present invention relates to a polarized plastic lens for spectacles and a method for manufacturing a polarized plastic lens for spectacles.

DESCRIPTION OF RELATED ART

Conventionally, a polarized plastic lens is known, for blocking a specific polarization directional light reflected by a water surface, etc., (for example, see patent document 1).

As a polarized lens, there are conventionally provided a plastic polarized lens configured to attach a polarized film between two lens base materials, and a plastic polarized lens configured so that the polarized film is embedded into a lens by injecting a raw material monomer around the polarized film, and polymerizing and curing the injected monomer.

In order to manufacture the plastic polarized lens in which the polarized film is embedded in the lens, a gasket as described in patent document 1 is used.

The gasket described in patent document 1 is configured so that a supporting projection is formed over the whole circumference, for setting and supporting the polarized film on the inner surface of a side wall portion, and an insertion groove is similarly formed on a top surface of the supporting projection portion over the whole circumference, into which a peripheral edge portion of the polarized film is inserted and supported. Thus, the plastic polarized lens is manufactured in such a way that the peripheral edge portion of the polarized film is inserted and supported into/by the insertion groove of the supporting projection portion, and the raw material monomer is injected around the polarized film.

PRIOR ART DOCUMENT

Patent Document

Patent document 1: Japanese Patent Laid Open Publication No. 2001-311804

SUMMARY OF THE INVENTION

However, when the polarized film is retained using the gasket, a retaining position of the polarized film is determined by a design and a manufacturing precision of the gasket, irrespective of a thickness and a shape difference (precision of a curved surface) of the polarized film, because the polarized film is retained by inserting the polarized film into the previously provided insertion groove. As a result, there is a variation in the position of the polarized film after molding. Therefore, the lens is required to be molded in a thickness in consideration of such a variation, thus involving a problem that the lens is formed in a larger thickness than a normal plastic lens for spectacles (plastic lens for spectacles having no polarized film).

An object of the present invention is to provide a polarized plastic lens for spectacles configured to be thin having almost the same thickness as the thickness of the normal plastic lens for spectacles, and a method for manufacturing the polarized plastic lens for spectacles.

Means for Solving the Problem

According to an aspect of the present invention, there is provided a polarized plastic lens for spectacles, including:

a first lens base material having an object-side surface;

a second lens base material having an eyeball-side surface; and a polarized film provided between the first lens base material and the second lens base material, so that a minimum value of a distance between the object-side surface and the polarized film is 0.3 mm or more and 0.7 mm or less.

According to this structure, the minimum value of the distance between the object-side surface and the polarized film is 0.3 mm or more and 0.7 mm or less, and therefore the polarized plastic lens for spectacles can be manufactured, which is configured to be thin having almost the same thickness as the thickness of the normal finished lens having no polarized film. Here, if the minimum value of the distance between the object-side surface and the polarized film is set to less than 0.3 mm, it is difficult to form the eyeball-side surface during manufacture, and as a result, it is also difficult to manufacture the polarized plastic lens for spectacles. Meanwhile, if the minimum value of the distance between the object-side surface and the polarized film is set exceeding 0.7 mm, it is difficult to produce a thinner polarized plastic lens for spectacles even if the eyeball-side surface is polished to a level of an edging limit. Generally, the normal finished lens having no polarized film has a thickness of about 1.1 mm at a thinnest portion. Further, an edging limit of allowing the eyeball-side surface to be thin by polishing is about 0.4 mm. Accordingly, if a maximum value of the distance between the object-side surface and the polarized film is set exceeding 0.7 mm, the thickness of the finished lens exceeds 1.1 mm even if the eyeball-side surface is polished to a level of the edging limit, thus making it impossible to produce the polarized plastic lens configured to be thin having almost the same thickness as the thickness of the normal finished lens. Note that the polarized plastic lens for spectacles means either one of a semi-finished lens and a finished lens obtained by polishing the semi-finished lens. The finished lens includes a lens subjected to edging in accordance with a spectacle frame, and a lens before edging.

In this embodiment, the polarized film preferably has a convex shape toward the object-side surface.

According to this structure, since the polarized film has the convex shape toward the object-side surface, the polarized film can be arranged between the first lens base material and the second lens base material along the object-side curved surface. As a result, a thin-type polarized plastic lens for spectacles can be provided.

In this embodiment, the object-side surface is preferably a spherical surface.

According to this structure, since the object-side surface is the spherical surface, the polarized plastic lens for spectacles can be manufactured using a general-purpose mold.

Further, in this embodiment, the eyeball-side surface is preferably a prescription surface.

According to this embodiment, since the eyeball-side surface is the prescription surface, the polarized plastic lens for spectacles for correcting visual acuity can be provided by polishing the eyeball-side surface in accordance with a wearer's prescription.

In this embodiment, preferably, the first lens base material and the second lens base material have a refractive power of 1.60 or more.

According to this structure, since the lens base material having a high refractive power is used, the polarized plastic lens for spectacles can be further thinned.

Further, in this embodiment, the polarized film preferably includes polyvinyl alcohol.

Since the polyvinyl alcohol (abbreviated as PVA hereafter) is generally used as a polarizing material, the polarized plastic lens for spectacles can be easily provided by using PVA as the polarized film.

According to another aspect of the present invention, there is provided a method for manufacturing a polarized plastic lens for spectacles, including:

bonding at least a part of a peripheral edge portion of a mold for a first lens base material and at least a part of a peripheral edge portion of a polarized film to each other so that a minimum value of a distance between the polarized film and a concave surface of the mold for the first lens base material having the concave surface is 0.3 mm or more and 0.7 mm or less;

arranging a mold for a second lens base material on an opposite side of the mold for the first lens base material, with the polarized film sandwiched between them;

forming a first lens base material and a second lens base material by injecting a plastic material composition between the mold for the first lens base material and the polarized film, and between the mold for the second lens base material and the polarized film.

According to this structure, at least apart of the peripheral edge portion of the mold for the first lens base material and at least a part of the peripheral edge portion of the polarized film are bonded to each other so that the minimum value of the distance between the polarized film and the mold for the first lens base material is 0.3 mm or more and 0.7 mm or less. Therefore, a positional relation between the mold for the first lens base material and the polarized film is not largely fluctuated in a manufacturing process of a lens. As a result, the polarized plastic lens for spectacles can be manufactured, so that a maximum value of the distance between the object-side surface and the polarized film is 0.3 mm or more and 0.7 mm or less.

BRIEF DESCRIPTION OF THE DRAWINGS

FIG. 1 is a cross-sectional view of a polarized plastic lens for spectacles according to an embodiment of the present invention, wherein (A) shows an example of the polarized plastic lens for spectacles with relatively a small base curve, and (B) shows the polarized plastic lens with relatively a large base curve.

MODE FOR CARRYING OUT THE INVENTION

Figure 2:
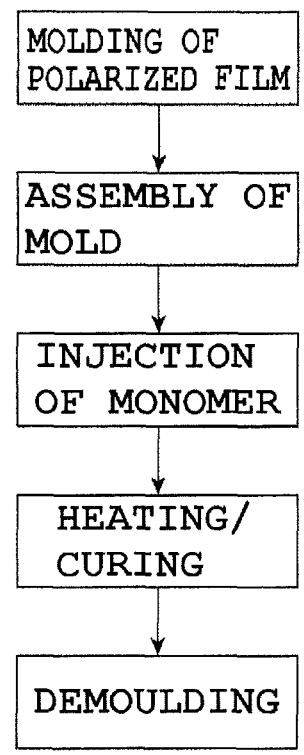
FIG. 2 is a view showing a manufacturing step of the polarized plastic lens for spectacles according to an embodiment of the present invention.

An embodiment of the present invention will be described based on the drawings.

FIG. 1 is a cross-sectional view of a polarized plastic lens for spectacles. The lens of FIG. 1 is a semi-finished lens (called a plastic lens hereafter). Note that in this embodiment, a lens obtained by polishing a plastic lens 100 in accordance with a wearer's prescription is called a finished lens. FIG. 1(A) shows an example of the polarized plastic lens for spectacles with relatively a small base curve, and FIG. 1(B) shows an example of the polarized plastic lens for spectacles with relatively a large base curve.

<Structure of a Lens>

As shown in FIG. 1(A) and FIG. 1(B), the plastic lens 100 is a plastic lens for spectacles, and is configured to provide a polarized film 14 between a first lens base material 110 and a second lens base material 120. The first lens base material 110 is provided on an (object-side) surface of the plastic lens 100, and the second lens base material 120 is provided on an (eyeball-side) rear surface. Then, the lens base material 110 has an object-side surface 111 on an opposite side of a surface facing the polarized film 14, and the second lens base material 120 has an eyeball-side surface 121 on an opposite side of the surface facing the polarized film 14. Wherein, the polarized film 14 preferably has a convex shape toward the object-side surface 111. Thus, the polarized film 14 can be arranged along the shape of the object-side surface 111, and therefore polishable thickness of the second lens base material 120 can be larger than a case that the polarized film has a convex shape toward the eyeball-side surface 121.

The first lens base material 110 and the second lens base material 120 are preferably made of transparent plastic with a refractive power of 1.60 or more. The first lens base material 110 and the second lens base material 120 are made of materials such as acrylic resin, thiourethane resin, thioepoxy resin, methacrylic resin, aril resin, episulfide resin, and polycarbonate resin, etc. The thiourethane resin and the thioepoxy resin are preferable among these resins from a viewpoint of thinning the lens. Note that the first lens base material 110 and the second lens base material 120 are preferably made of the same material.

The minimum value of the distance between the object-side surface 111 of the plastic lens 100 and the polarized film 14 is 0.3 mm or more and 0.7 mm or less. The position where the distance between the object-side surface 111 and the polarized film 14 is minimum, is different depending on a combination of a curvature of the object-side surface 111 (base curve in a single focus lens and unit is diopter), and a curvature of the polarized film 14. Further, a point where the distance between the object-side surface 111 and the polarized film 14 is minimum is not limited to one point. For example, if the curvature of the polarized film 14 is larger than the curvature of the object-side surface 111, vertex T of the object-side surface 111 is the point where distance W1 between the object-side surface 111 and the polarized film 14 is smallest, and if the curvature of the polarized film 14 is smaller than the curvature of the object-side surface 111, an outer peripheral portion of the object-side surface 111 includes the point where the distance W1 between the object-side surface 111 and the polarized film 14 is smallest. When the curvature of the object-side surface 111 and the curvature of the polarized film 14 are equal to each other, it can be considered that the distance between the object-side surface 111 and the polarized film 14 is constantly minimum in the whole body of the object-side surface 111. The plastic lens 100 shown in FIG. 1(A) is a single focus lens in which the base curve is 2D (diopter), the curvature of the polarized film 14 is 3D, and the prescription power is minus. In the plastic lens 100 of FIG. 1(A), vertex T of the object-side surface 111 is the point where distance W1 between the vertex T of the object-side surface 111 and the polarized film 14 is smallest, wherein the distance between the object-side surface 111 and the polarized film 14 is 0.3 mm or more and 0.7 mm or less. Here, vertex T is an intersection point of a vertical line passing through a center of a circle, and the object-side surface 111 when the semi-finished lens (plastic lens 100) is viewed in planar view, or may be an eye point (point where a visual line and the object-side surface 111 intersect each other at a first eye position when wearing the spectacles), or may be a fitting point in the finished lens. The plastic lens 100 shown in FIG. 1(B) is a single focus lens in which the base curve is 10D, the curvature of the polarized film 14 is 8D, and the prescription power is plus. In the plastic lens 100 of FIG. 1(B), the outer peripheral portion of the object-side surface 111 (position where a side face of the lens and the object-side surface 111 intersect each other) is an area where distance W1 between the outer peripheral portion of the object-side surface 111 and the polarized film 14 is smallest, wherein the distance between the outer peripheral portion and the polarized film 14 is 0.3 mm or more and 0.7 mm or less.

Further, the first lens base material 110 is preferably configured so that an opposite side of the surface facing the polarized film 14 is the object-side surface 111, and the object-side surface 111 is a spherical surface. By forming the object-side surface 111 into the spherical surface, the plastic lens 100 can be easily manufactured, and can be manufactured using a general-purpose mold.

In the second lens base material 120, the eyeball-side surface 121 is a prescription surface.

When the finished lens is manufactured, the minimum value of the distance W2 between the second lens base material 120 and the polarized film 14 is set to about 0.3 mm to 0.4 mm by polishing the eyeball-side surface 121 of the second lens base material 120. As a result, the minimum value of thickness W of the finished lens can be 1.1 mm or less which is almost the same thinness as the thinness of a normal finished lens. Here, the normal finished lens means a lens for spectacles in which a film such as a polarized film is not provided between the first lens base material 110 and the second lens base material 120. Further, the position where the thickness of the finished lens is minimum, is different depending on the combination of the curvature of the object-side surface 111 and the curvature of the polarized film 14, and is not limited to one point. For example, if the curvature of the polarized film 14 is larger than the curvature of the object-side surface 111, thickness W of the finished lens is minimum at the position of the vertex T. In this case, the following two points coincide with each other: the point where the object-side surface 111 and the polarized film 14 is minimum in the plastic lens 100 (semi-finished lens), and the point where the thickness W of the finished lens is minimum. Then, a length of a line segment connecting the vertex T and the intersection point of the vertical line passing through the vertex T of the object-side surface 111 and the eyeball-side surface 121 when the finished lens is viewed in planar view, is the minimum value of the thickness W of the finished lens. Also, the following two minimum values coincide with each other: the minimum value of the distance W1 in the plastic lens 100 and the minimum value of the distance W1 in the finished lens. Meanwhile, if the curvature of the polarized film 14 is smaller than the curvature of the object-side surface 111, the outer peripheral portion of the object-side surface 111 includes the point where the thickness W of the finished lens is minimum in the finished lens. In this case, in the plastic lens 100, the following two points don't necessarily coincide with each other: the point where distance W1 between the object-side surface 111 and the polarized film 14 is minimum, and the point where the thickness W of the finished lens is minimum. Then, distance W1 in the plastic lens 100 and distance W1 in the finished lens are not necessarily equal to each other. For example, when the finished lens is already subjected to edging, the outer peripheral portion of the object-side surface 111 (position where a lens side face and the object-side surface 111 intersect each other) is positioned inside of the outer peripheral portion of the object-side surface 111 of the plastic lens 100 in planar view, and the minimum value of the distance W1 in the finished lens is larger than the minimum value of the distance W1 in the plastic lens 100, and the distance W1 is not limited to 0.7 mm or less. When the curvature of the object-side surface 111 and the curvature of the polarized film 14 are equal to each other, it can be considered that thickness W of the finished lens is constantly minimum in the whole body of the object-side surface 111. Further, the thickness of the polarized film 14 is the thickness that can be ignored as described later compared with the thickness W of the plastic lens 100, and therefore the thickness of the polarized film 14 can be ignored for convenience.

The polarized film 14 of this embodiment is a film-like base material in which curved surface machining is applied to a commercially available iodine polarized film by press molding and vacuum molding, etc., to obtain a specific curvature so that an outer shape is cut into a circular shape. The thickness of the polarized film 14 is preferably about 10 μm to 500 μm. When the thickness is less than 10 μm, rigidity is weak, thus making it difficult to handle such a polarized film 14. Further, when the thickness exceeds 500 μm, the specific curvature is hardly obtained when the curved surface machining is applied.

The polarized film used for the polarized film 14 is preferably a single layer or multilayer film including a resin layer which is composed of polyvinyl alcohol (PVA). PVA is a material excellent in transparency, heat-resistance, affinity with iodine as a stain or a dichroic dye, and orientation in stretching.

The multilayer polarized film 14 can be obtained by molding the PVA impregnated with iodine into a film-shape and stretching it uniaxially to form a resin layer, and thereafter laminating triacetylcellulose (TAC) on both surfaces of the resin layer as a protective layer.

Note that a polarized film fabricated using a dichroic dye instead of the iodine, can also be used. Further, as the single layer polarized film, the polarized film fabricated using PVA with the protective layer of TAC not laminated thereon, and polyethylene terephthalate (PET) instead of PVA, can also be used. In this embodiment, the polarized film 14 made of PVA with the protective layer of TAC not laminated thereon, is used.

<Method for Manufacturing a Lens>

A method for manufacturing the plastic lens 100 of this embodiment will be described based on the drawings.

FIG. 2 is a view showing manufacturing steps of manufacturing the plastic lens 100 according to this embodiment. The manufacturing method of this embodiment is executed through roughly divided five steps as shown in FIG. 2. The steps will be sequentially described hereafter.

(Molding of the Polarized Film)

Figure 3:
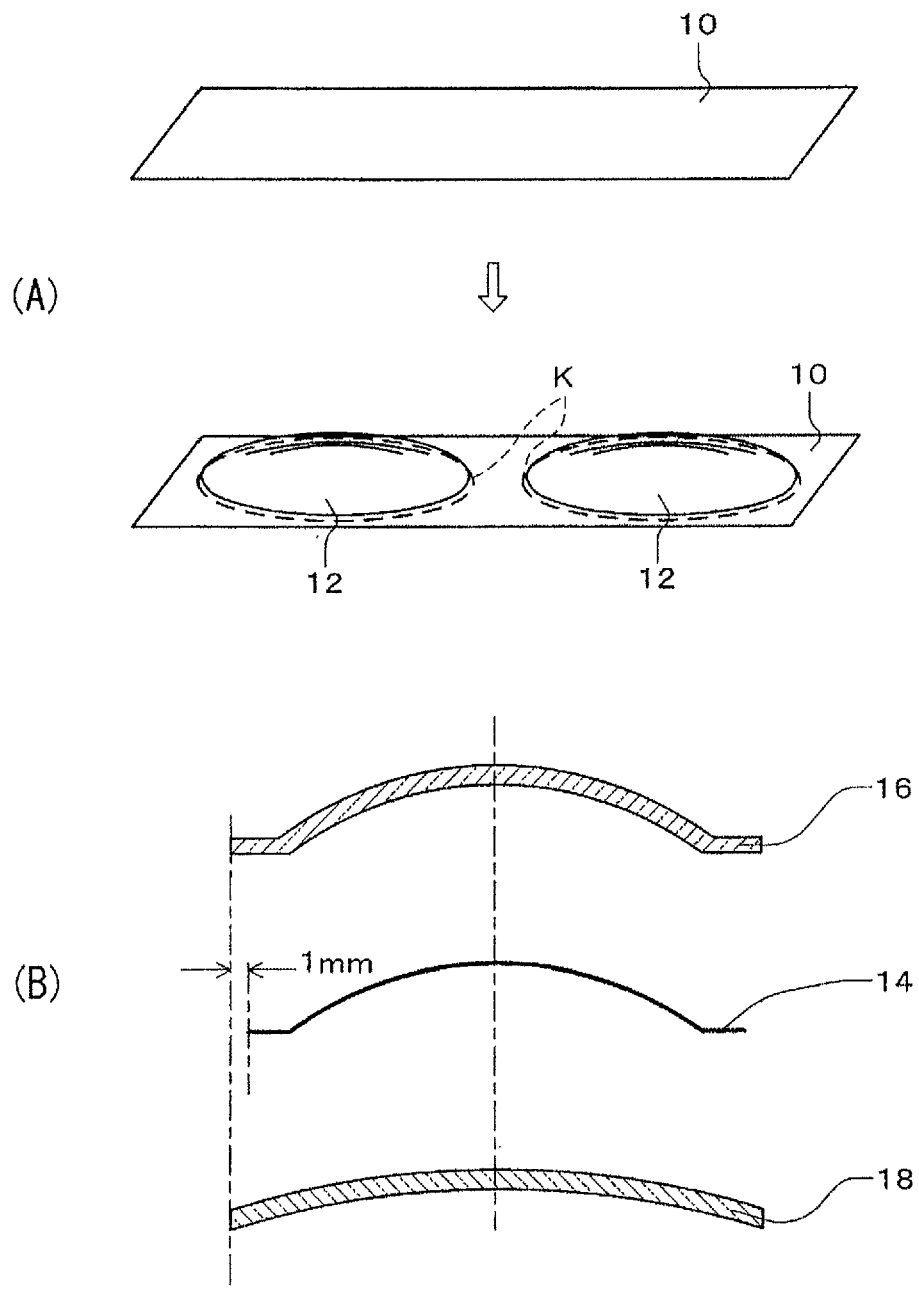
FIG. 3 is a view showing a molding method of molding a polarized film according to an embodiment of the present invention.

FIG. 3 is a view showing a method for molding the polarized film 14 according to this embodiment.

As shown in FIG. 3(A), two spherical-shaped curved surfaces 12 are formed by pressing a flat-shaped sheet body 10 obtained by cutting a uniaxially stretched PVA film into a rectangular shape by a publicly-known press means. The curvature of each curved surface 12 is set according to the base curve (curvature of the object-side surface 111) of the plastic lens 100 which is scheduled to be manufactured (see FIG. 1). For example, the curvature of the curved surface 12 may be large, as the base curve becomes larger. The polarized film 14 may be formed having the same curvature as the curvature of the base curve of the plastic lens 100. In this embodiment, the size of the base curve is divided into several stages, and a curved surface 12 having a different curvature is set in each stage. In this embodiment, the polarized film 14 is obtained by cutting the sheet body 10 along broken lines K in the figure, while remaining the sheet body 10 portion around each curved surface 12.

As shown in FIG. 3(B), a diameter of the polarized film 14 is preferably smaller than inner diameters of a first mold (mold for the first lens base material) 16 and a second mold (mold for the second lens base material) 18. For example, the diameter of the polarized film 14 in this embodiment is smaller by about 2 mm than the inner diameter of the first mold 16. Thus, when monomer of the lens base material is injected into a cavity, the monomer goes around to both sides of the polarized film 14, thus making it easy to smoothly inject the monomer into the cavity.

(Assembly of the Mold)

Figure 4:
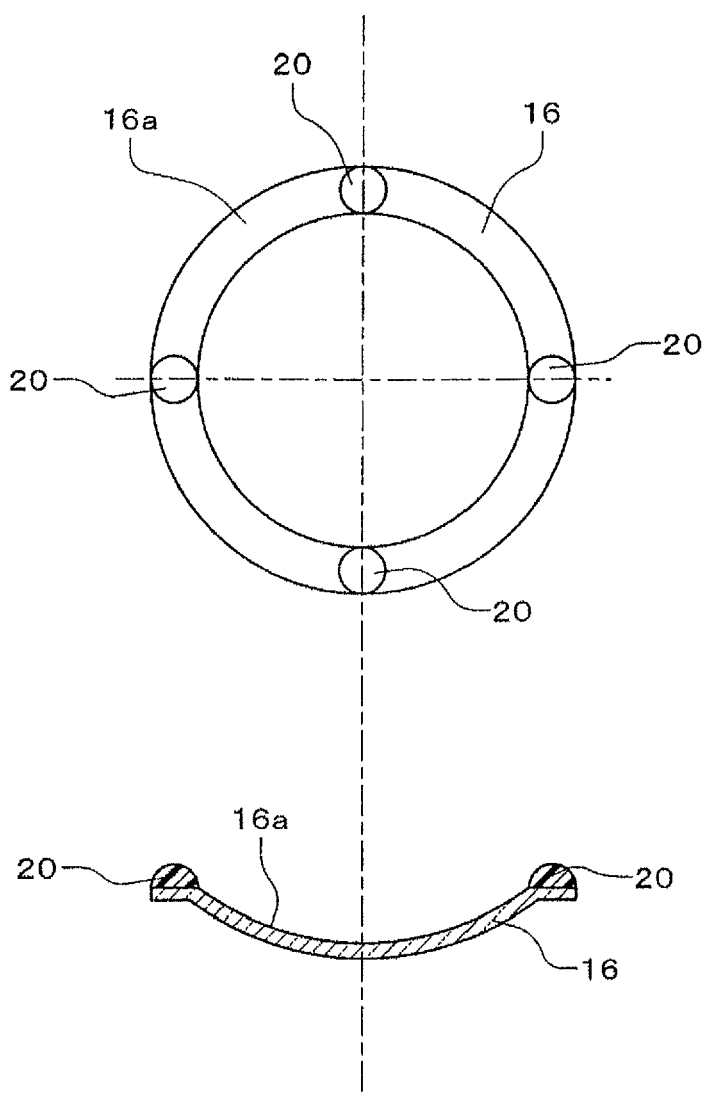
FIG. 4 is a view showing a method for manufacturing a polarized plastic lens for spectacles according to an embodiment of the present invention.

FIG. 4 is a planar view of the first mold of this embodiment viewed from below (eyeball side of plastic lens 100 scheduled to be manufactured).

Subsequently to molding the polarized film 14, an adhesive agent 20 is applied to a rear surface 16a of the first mold 16. The adhesive agent 20 is applied to a plurality of places of the outer peripheral portion (peripheral edge portion) of the rear surface 16a of the first mold 16. For example, the adhesive agent 20 is applied to three or four places of the outer peripheral portion. In this embodiment, the adhesive agent 20 is applied to four places of an edge portion in four perpendicular directions. For example, a UV-ray curing type adhesive agent 20 is applied to the outer peripheral portion of the polarized film 14 using a dispenser.

The first mold 16 is the mold used for forming either one surface of the objective-side surface 111 and the eyeball-side surface 121 of the plastic lens 100. In this embodiment, the first mold 16 is the mold used for forming the object-side surface 111 of the plastic lens 100. The first mold 16 is made of glass, and is formed into a circular shape in planer view. The rear surface 16a which is a concave surface of the first mold 16 is formed as a curved surface for molding the object-side surface 111 of the plastic lens 100 which is scheduled to be molded. The kind (inorganic matter or organic matter) of the first mold 16 is not particularly limited, if it is the material having a property of transmitting UV-rays. In this embodiment, crown glass is used for the first mold 16. A light transmissive organic matter (for example resin) is deteriorated due to irradiation of UV-rays, and therefore is not suitable for the mold for molding the plastic lens in large quantity. However, the light transmissive organic matter may be used for the mold for molding a small quantity of a sample product, etc., for example, utilizing an advantage of a low cost.

The adhesive agent 20 used in this embodiment is a UV-ray curing resin material. The UV-ray curing resin material has a property of reacting with an optical energy of UV-ray and chemically changing in a solid state from a liquid state as generally known. The UV-ray curing resin material is composed of synthetic resin containing prepolymer, monomer, a photoinitiator, and an additive agent. The kind of the UV-ray curing resin material used in this embodiment is not particularly limited, but a suitable material is selected according to a specification of the monomer. In this embodiment, UV-ray curing epoxy resin P is used.

Figure 5:
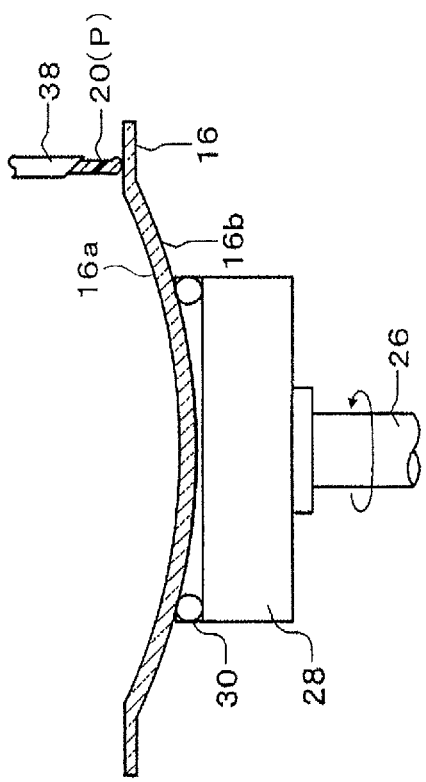
FIG. 5 is a view showing the method for manufacturing a polarized plastic lens for spectacles according to an embodiment of the present invention.
Figure 6:
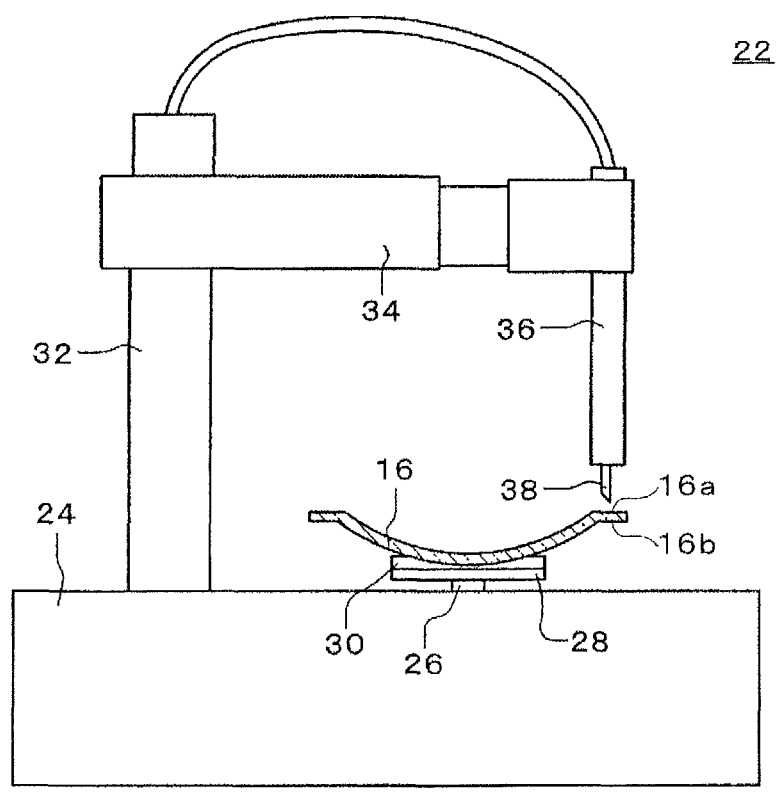
FIG. 6 is a view showing the method for manufacturing a polarized plastic lens for spectacles according to an embodiment of the present invention.

FIG. 5 is a view showing a method for applying the adhesive agent 20 to the first mold 16, and FIG. 6 is a view showing an ejector for ejecting the adhesive agent 20. Outline of the ejector 22 for applying the adhesive agent 20 will be described based on FIG. 5 and FIG. 6. The ejector 22 has a main body 24 including a motor device not shown, a rotation axis 26 protruded upward from the main body 24, and a turn table 28 disposed on an upper end of the rotation axis 26. A flexible ring-shaped fixing pad 30 disposed to abut on the vicinity of the peripheral edge of the surface 16b of the first mold 16, is set on an upper surface of the turn table 28 (a side face is shown in the figure). The reason for using the ring-shaped fixing pad 30 is that fixing means of the first mold 16 is not allowed to be brought into contact with a light transmission surface of the surface 16b as much as possible. A syringe 36 is mounted on a rod 32 which extends upward from the main body 24, via a slider 34. The syringe 36 ejects a constant amount of sticky adhesive agent 20 (UV-ray curing epoxy resin P) from a tip end of a needle by pneumatic control by a dispenser device disposed in the main body 24 not shown.

Note that actually, a plurality of turntables 28 and syringes 36 are prepared in the ejector 22, so that the adhesive agent 20 can be applied to a plurality of first molds 16 by one ejector 22.

An adhesive agent application method using the adhesive agent 20 and the ejector 22 will be briefly described next. The adhesive agent 20 is applied to the outer peripheral portion of the first mold 16 using the dispenser. After the first mold 16 is positioned, the adhesive agent is applied to the outer peripheral portion of the first mold 16. As shown in FIG. 5 and FIG. 6, the first mold 16 is placed on the fixing pad 30 of the turntable 28, the position of the syringe 36 is suitably adjusted, and the needle 38 is disposed at a position facing the outer peripheral portion of the rear surface 16a of the first mold 16. Then, the ejector 22 is driven. Namely, the turntable 28 is rotated so that the first mold 16 is rotated in a circumferential direction, and when the position scheduled to be applied with the adhesive agent 20 in the first mold reaches a lower part of the needle 38, the dispenser device is driven, and the adhesive agent 20 is discharged toward the outer peripheral portion of the rear surface 16a from the tip end of the needle 38. The height of the adhesive agent 20 is formed in almost the same height at each position scheduled to be applied with the adhesive agent 20. Further, in order to set the minimum value of the distance W1 between the polarized film 14 and the first mold 16 to 0.3 mm or more, the height of the adhesive agent 20 is set to 0.3 mm or more. The height of the adhesive agent 20 may be adjusted according to a distance between the polarized film 14 and the first mold 16.

Figure 7:
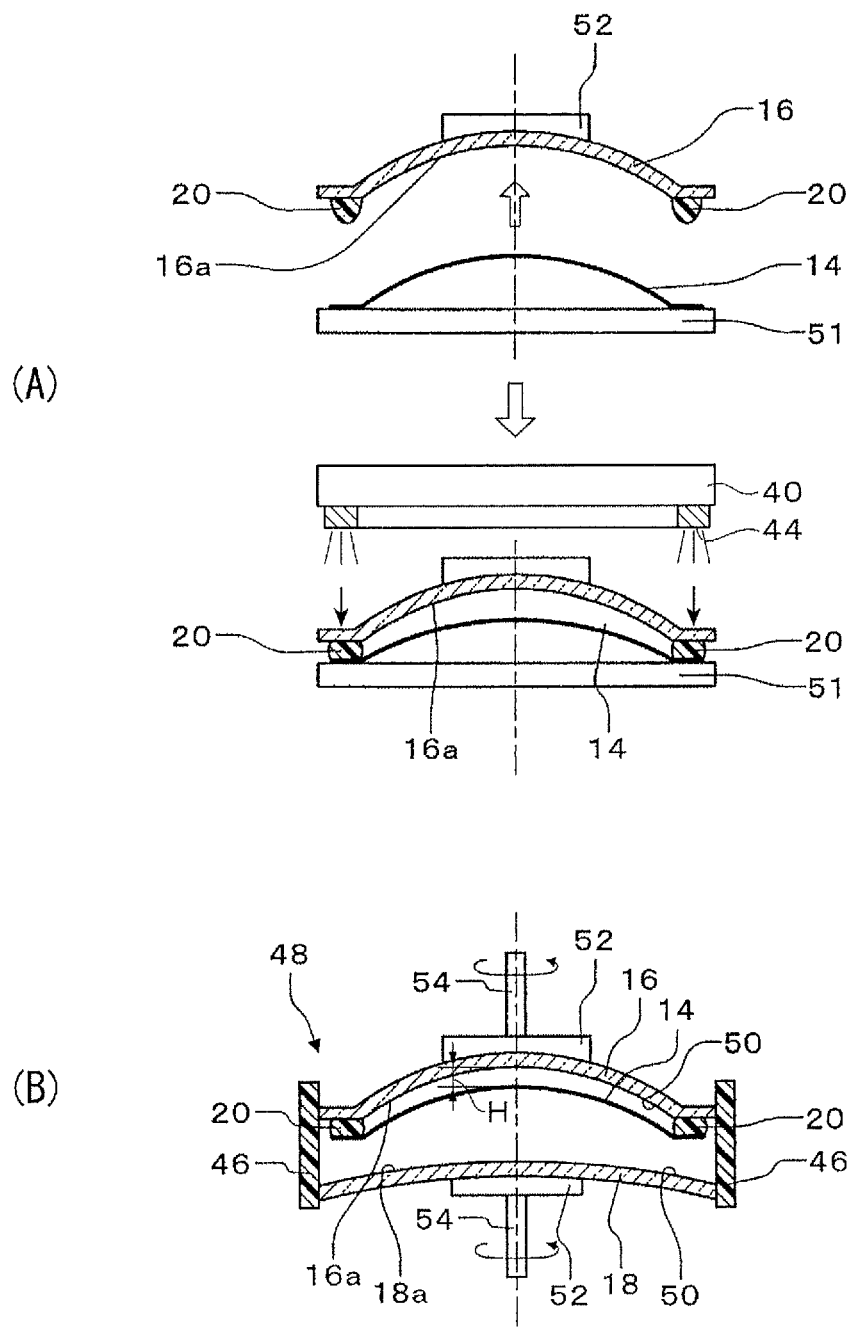
FIG. 7 is a view showing the method for manufacturing a polarized plastic lens for spectacles according to an embodiment of the present invention.
Figure 8:
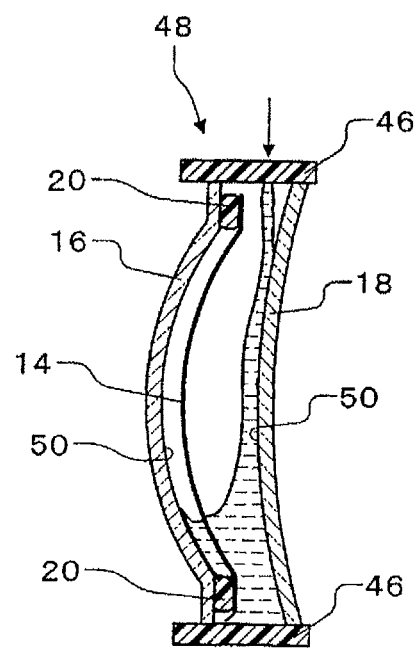
FIG. 8 is a view showing the method for manufacturing a polarized plastic lens for spectacles according to an embodiment of the present invention.

FIG. 7 and FIG. 8 are views showing a method for manufacturing the plastic lens 100 according to this embodiment.

First, a central height of the assembled first mold and a central height of the retained polarized film 14 are measured. In measuring the height of the polarized film 14, top height of the polarized film 14 is measured using a non-contact type sensor (for example, KEYENCE CCD transmission type digital laser sensor IG series), because the polarized film 14 is a soft film.

In measuring the height of the first mold 16, top height of the first mold 16 is measured using a contact type measurement probe (for example, Nikon digimicro MF serites or Mitutoyo digimatic indicator 543 series), because the first mold 16 is a hard mold.

Next, as shown in FIG. 7(A), the first mold 16 is placed on the polarized film 14 from a front direction of the polarized film 14, or the polarized film 14 retained by the fixing table 51 is approached to the first mold 16 retained by the fixing pad 52.

Next, based on the central heights of the first mold and the polarized film 14, the first mold 16 is approached to the polarized film 14 so that the minimum value of the distance H (called clearance H hereafter) between the rear surface 16*a* of the first mold 16 and the polarized film 14 is 0.3 mm or more and 0.7 mm or less. Thereafter, a UV-ray irradiation device 40 is driven so that the adhesive agent 20 is irradiated with UV-ray from the tip end of an irradiation lamp 44, to thereby solidify the adhesive agent 20. The time required for such an UV-ray irradiation is short (several seconds to several tens of seconds) although depending on the kind of the selected adhesive agent 20, and therefore an influence on a manufacturing cycle can be suppressed. For example, the adhesive agent 20 is irradiated with UV-ray for 15 seconds at 500 mW. When it is so judged that UV-ray irradiation is insufficient, the turntable 28 is suitably rotated so that the formed adhesive agent 20 can be continuously irradiated with UV-ray by the UV-ray irradiation device 40. In this embodiment, contraction or expansion of monomer due to heating and curing described later, can be ignored. Therefore, it can be considered that the minimum value of the clearance H is equal to the minimum value of the distance W1 between the object-side surface 111 and the polarized film 14. When there is a variation in the thickness of the monomer cured product by heating and curing, etc., the minimum value of het clearance H is preferably set in consideration of such a variation.

Next, the second mold 18 is disposed to face the polarized film 14 so as to obtain the set thickness W. Namely, the first mold 16 and the second mold 18 are disposed to sandwich the polarized film 14 between them. The second mold 18 is a circular plate-shaped body made of glass. The surface 18*a* of the second mold 18 is a curved surface for molding the eyeball-side surface 121 of the plastic lens 100 which is scheduled to be molded.

Next, as shown in FIG. 7(B), a pair of the first mold 16 and the second mold 18 are retained at an interval required for molding the plastic lens 100, and an adhesive tape (interval keeping member) 46 having an adhesive layer on one side is wound around the side faces of two first and second molds 16 and 18, slightly more than one round. At this time, the first mold 16 and the second mold 18 are set on the fixing pad 52. The fixing pad 52 is driven to rotate by the rotation axis 54 protruded from the motor device not shown.

The material of the adhesive tape 46 is not particularly limited. However, a plastic adhesive tape is preferably used from a viewpoint of easiness to use and economic efficiency, etc. For example, a polypropylene material and a polyethylene telephthalate material are used as the base material of the adhesive material, in combination with an acrylic and natural rubber-based or silicon-based adhesive agent. Note that the adhesive tape 46 may have an injection hole (not shown) for injecting monomer.

An assembly of the first mold 16, the second mold 18, and the adhesive tape 46 with the polarized film 14 interposed between them, is formed as a matrix 48.

(Injection of Monomer)

Next, as shown in FIG. 8, in the assembled matrix 48, the mixed monomer mixed is injected into a cavity 50 formed by a pair of the first mold 16 and the second mold 18 and the adhesive tape 46, from an injection hole using an injector, so that the cavity 50 is filled with the monomer in such a manner that bubbles are not remained.

(Heating and Curing)

Thereafter, the matrix 48 filled with monomer is put in a heating furnace and is heated. Wherein a heating temperature is preferably set to 0 to 150° C., and more preferably set to 10 to 130° C., and the temperature is increased preferably taking time for 5 to 50 hours, and more preferably taking time for 10 to 25 hours so that polymerization is carried out. For example, the monomer is retained for 7 hours at 30° C., and thereafter the temperature is increased from 30 to 120° C. taking time for 10 hours.

(Demoulding)

When heat treatment is ended, the monomer is solidified and a monomer cured product is molded, including the polarized film 14 in the matrix 48. The matrix 48 is taken-out from the heating furnace, the adhesive tape 46 is peeled-off, and the first mold 16 and the second mold 18 are separated from the monomer cured product, to thereby obtain the plastic lens 100 (semi-finished lens) shown in FIG. 1. The minimum value of the thickness W of the plastic lens 100 in this embodiment is 5 mm.

(Polishing)

Thereafter, polishing is applied to the eyeball-side surface 121 of the plastic lens 100 so that the minimum value of the distance W2 between the second lens base material 120 and the polarized film 14 is set to about 0.3 mm to 0.4 mm, to thereby obtain a finished lens in which the minimum value of the thickness W is set to 1.1 mm or less.

(Surface Treatment)

Primer coating, hard coating, antireflective film coating, and water-repellent and oil-repellent treatment, may be further applied to the finished lens after polishing.

According to this embodiment, the minimum value of the clearance H is set to 0.3 mm or more and 0.7 mm or less. Therefore, the plastic lens 100 can be obtained, in which the minimum value of the distance W1 between the object-side surface 111 and the polarized film 14 is set to 0.3 mm or more and 0.7 mm or less. When the eyeball-side surface 121 of the second lens base material 120 is polished in the plastic lens 100, the minimum value of the thickness W of the finished lens can be set to 1.1 mm or less, and the finished lens configured to be thin having almost the same thickness as the thickness of the normal finished lens can be provided.

Further, the object-side surface 111 of the first lens base material 110 is formed into the spherical surface, and therefore manufacture is easy and the general-purpose mold can be used.

Further, the plastic lens 100 can be further thinned by setting the refractive indexes of the first lens base material 110 and the second lens base material 120 to 1.60. For example, in the lens having a larger absolute value of the prescription power (stronger prescription), the lens can have almost the same thickness as the thickness of the lens having a weaker power.

Further, since the PVA is used as the polarized film 14, the polarized plastic lens for spectacles can be easily provided.

Note that the present invention can also be modified as follows.

In the abovementioned embodiment, the adhesive agent 20 is solidified by irradiation of the UV-ray using the light curing resin. However, the adhesive agent 20 may also be solidified by heating using a heat curing resin.

In the abovementioned embodiment, the adhesive agent 20 is applied to the first mold 16 while rotating the first mold 16. However, the adhesive agent 20 may be also applied to the first mold 16 by moving the syringe 36 side.

In the abovementioned embodiment, an object to be applied with the adhesive agent 20 is not limited to the first mold 16, and the adhesive agent 20 may also be applied to the polarized film 14. Further, when the first mold 16 and the polarized film 14 are approached to each other, not only a method for moving the polarize film 14 only, but also a method for moving the first mold 16 or moving both of the first mold 16 and the polarized film 14 may be used to make the first mold 16 and the polarized film 14 approached to each other. Further, the adhesive agent 20 may also be applied to the second mold 18 (mold for forming the eye-ball side surface). In this case, the adhesive agent is applied to the second mold 18 in a height in which the minimum value of the clearance H is 0.3 mm or more and 0.7 mm or less. For example, the height of the adhesive agent may be determined as a difference between the minimum value of the clearance H and the minimum value of the interval between the first mold 16 and the second mold 18.

In the abovementioned embodiment, the polarized film 14 curved into a spherical shape is given as an example. However, a flat plate-shaped polarized film 14 may also be used. Further, in the polarized film 14, the circumference may not be necessarily formed into a circular shape.

The material of the polarized film 14 of this embodiment is not limited to the abovementioned material. Although a single layer PVA is used in the abovementioned embodiment, a film (TPT) having the following structure may also be used: namely, both sides of the resin layer made of PVA are sandwiched by a protective layer made of triacetylcellulose. Further, the protective layer may be arranged only one side.

The structure of the ejector 22 of this embodiment is given as an example and can be freely suitably changed to other means for applying the adhesive agent 20 to the mold.

Further, the shape of the first mold 16 and the second mold 18 is not limited to the shape used in the abovementioned embodiment. Moreover, the finished lens may be either the single focus lens or a progressive power lens.

Example

An example will be described next.

First, mixture of monomer used in this example will be described hereafter (mixture of monomer)

(1) Thiourethane 1.60 (monomer of thiourethane having a refractive index of 1.60), 50 g of norbornene diisocyanate, 24 g of a polythiol compound mainly composed of pentaerythritol tetrakis (3-mercapto propionate), and a polythiol compound mainly composed of 4-mercaptomethyl-3,6-dithia-1,8-octandithiol, were mixed and sufficiently stirred, as a plastic lens material.

Then, 2.5 g of "SEESORB709" (brand name: produced by SHIPRO Inc.) was added as an UV absorber, and 0.1 g of "MR internal mold release agent" (brand name: produced by Mitsui Chemicals, Inc.) was added as an internal release agent, which were mixed and sufficiently stirred, and 250 ppm of dibutyltin dichloride was added into a completely dispersed or dissolved plastic lens material, which were sufficiently stirred at room temperature, to thereby obtain a homogeneous liquid composition. Subsequently deaeration was carried out for 30 minutes while stirring the composition in a decompressed state of 5 mmHg.

(2) Thiourethane 1.67 (monomer of a thiourethane base material having a refractive index of 1.67), 50.6 g of m-xylene diisocyanate, 49.4 g of 4,8-dimercaptomethyl-1,11-dimercapto-3,6,9-trithiaundecane, were mixed and sufficiently stirred, as a plastic lens material. Note that 4,7-dimercapto-1,11-dimercapto-3,6,9-trithiaundecane or 5,7-dimercaptomethyl-1,11-dimercapto-3,6,9-trithiaundecane may also be used instead of 4,8-dimercaptomethyl-1,11-dimercapto-3,6,9-trithiaundecane.

Then, 1.2 g of "SEESORB701" (brand name: produced by SHIPRO Inc.) was added as an UV absorber, and 0.1 g of "MR internal mold release agent" (brand name: produced by Mitsui Chemicals, Inc.) was added as an internal release agent, which were mixed and sufficiently stirred, and 100 ppm of dibutyltin dichloride was added as a catalyst into a completely dispersed or dissolved plastic lens material, which were sufficiently stirred at room temperature, to thereby obtain a homogeneous liquid.

Subsequently deaeration was carried out for 30 minutes while stirring the composition in a decompressed state of 5 mmHg.

(3) Thioepoxy 1.74 (monomer of a thioepoxy base material having a refractive index of 1.74), and 90.0 g of bis-(2,3epithiopropyl)disulfide, and 10.0 g of 4,8-dimercaptomethyl-1,11-dimercapto-3,6,9-trithiaundecane, were mixed and sufficiently stirred, as a plastic lens material. Note that 4,7-dimercapto-1,11-dimercapto-3,6,9-trithiaundecane or 5,7-dimercaptomethyl-1,11-dimercapto-3,6,9-trithiaundecane may also be used instead of 4,8-dimercaptomethyl-1,11-dimercapto-3,6,9-trithiaundecane.

Then, 1.2 g of "SEESORB701" (brand name: produced by SHIPRO Inc.) was added as an UV absorber, which were mixed and sufficiently stirred, and thereafter 0.10 g of N,N-dimethyl cyclohexylamine was mixed as a catalyst, which were sufficiently stirred at room temperature, to thereby obtain a homogeneous liquid.

Subsequently deaeration was carried out for 30 minutes while stirring the composition in a decompressed state of 5 mmHg.

Table 1 shows details of examples 1 to 12, and comparative examples 1 to 5. In table 1, monomer is the monomer obtained by the abovementioned "mixture of the monomer". H indicates the minimum value of the clearance (simply called clearance H hereafter), and W1 indicates the minimum value of the distance between the eyeball-side surface of the plastic lens (semi-finished lens) and the polarized film, and W indicates the minimum value of the thickness of the finished lens (simply called thickness W hereafter). SF is an abbreviation of semi-finish. In this example, the position where the clearance is minimum, is the central part (position of vertex T) of the semi-finished lens when the base curve is less than 6D, and is the outer peripheral portion of the semi-finished lens when the base curve is 6D or more, and therefore clearance H is set at this position in each example. In the fabricated plastic lens, the position where the distance between the eyeball-side surface and the polarized film is minimum, is the same position as the position where the clearance H was set. In each example and comparative example, ten lenses were fabricated. Note that in some of the examples, the curvature of the polarized film is changed according to the base curve of the lens. However, the polarized film having the same curvature can be used in all examples.

Example 1

The plastic lens 100 was obtained by a method described in the embodiment, using the monomer of thiourethane 1.60 obtained by the mixture of monomer. Subsequently, polishing and surface treatment were applied to the obtained plastic lens 100, to thereby obtain the finished lens.

Example 2

The finished lens was obtained similarly to example 1, excluding a point that in example 1, the minimum value of the clearance H was set to a value descried in table 1.

Examples 3 to 4

The finished lens was obtained similarly to example 1, excluding a point that the monomer was changed in example 1, to the material described in table 1.

Examples 5 to 6

The finished lens was obtained similarly to example 1, excluding a point that the polarized film was changed in example 1, to the material described in table 1.

Example 7

The finished lens was obtained similarly to example 1, excluding a point that the base curve of the lens was set in example 1, to the value described in table 1.

Example 8

The finished lens was obtained similarly to example 1, excluding a point that the base curve of the lens was set in example 2, to the value described in table 1.

Examples 9 to 10, 12

The finished lens was obtained similarly to example 1, excluding a point that the base curve of the lens and the curvature of the polarized film are set in example 1, to the value described in table 1.

Example 11

The finished lens was obtained similarly to example 1, excluding a point that the base curve of the lens and the curvature of the polarized film are set in example 2, to the value described in table 1.

Comparative Examples 1 to 2

A similar work was performed as example 1, excluding a point that the minimum value of the clearance H was set in example 7 or example 8, to the value described in table 1.

Comparative Examples 3 to 4

A similar work was performed as example 1, excluding a point that the minimum value of the clearance H was set in example 10 or example 11, to the value described in table 1.

Comparative Example 5

The finished lens was obtained similarly to example 1, excluding a point that the polarized film was inserted into an insertion groove provided on a gasket, instead of determining the minimum value of the clearance H by bonding the polarized film to the adhesive agent.

TABLE 1

| | Polarized film | Monomer | Tape/ Gasket | Positioning system | Base curve of lens (D) | Curvature of polarized film (D) | H (mm) | W1(SF, Central part) (mm) | W1(SF, Outer peripheral portion) (mm) | W(Completed product) (mm) |
|---|---|---|---|---|---|---|---|---|---|---|
| Ex. 1 | PVA | 1.60 thiourethane | Tape | Adhesive agent | 4 | 3 | 0.7 | 0.7 | — | 1.1 |
| Ex. 2 | PVA | 1.60 thiourethane | Tape | Adhesive agent | 4 | 3 | 0.3 | 0.3 | — | 1.1 |
| Ex. 3 | PVA | 1.60 thiourethane | Tape | Adhesive agent | 4 | 3 | 0.7 | 0.7 | — | 1.1 |
| Ex. 4 | PVA | 1.74 thioepoxy | Tape | Adhesive agent | 4 | 3 | 0.7 | 0.7 | — | 1.1 |
| Ex. 5 | TPT | 1.60 thiourethane | Tape | Adhesive agent | 4 | 3 | 0.7 | 0.7 | — | 1.1 |
| Ex. 6 | PET | 1.60 thiourethane | Tape | Adhesive agent | 4 | 3 | 0.7 | 0.7 | — | 1.1 |
| Ex. 7 | PVA | 1.60 thiourethane | Tape | Adhesive agent | 2 | 3 | 0.7 | 0.7 | — | 1.1 |
| Ex. 8 | PVA | 1.60 thiourethane | Tape | Adhesive agent | 2 | 3 | 0.3 | 0.3 | — | 1.1 |
| Ex. 9 | PVA | 1.60 thiourethane | Tape | Adhesive agent | 6 | 4 | 0.7 | — | 0.7 | 1.1 |
| Ex. 10 | PVA | 1.60 thiourethane | Tape | Adhesive agent | 8 | 6 | 0.7 | — | 0.7 | 1.1 |
| Ex. 11 | PVA | 1.60 thiourethane | Tape | Adhesive agent | 8 | 6 | 0.3 | — | 0.3 | 1.1 |
| Ex. 12 | PVA | 1.60 thiourethane | Tape | Adhesive agent | 10 | 8 | 0.7 | — | 0.7 | 1.1 |
| Com. Ex. 1 | PVA | 1.60 thiourethane | Tape | Adhesive agent | 2 | 3 | 0.2 | — | — | — |
| Com. Ex. 2 | PVA | 1.60 thiourethane | Tape | Adhesive agent | 2 | 3 | 0.8 | 0.8 | — | 1.2 |
| Com. Ex. 3 | PVA | 1.60 thiourethane | Tape | Adhesive agent | 8 | 6 | 0.2 | — | — | — |
| Com. Ex. 4 | PVA | 1.60 thiourethane | Tape | Adhesive agent | 8 | 6 | 0.8 | — | 0.8 | 1.2 |
| Com. Ex. 5 | PVA | 1.60 thiourethane | Gasket | Gasket | 2 | 3 | 0.7 | 0.5-1.2 | — | 1.6 |

Ex. = Example
Com. Ex. = Comparative Example

In examples 1 to 2, when the clearance H was set to 0.3 mm or more and 0.7 mm or less, the plastic lens having distance W1 of 0.3 mm or more and 0.7 mm or less could be obtained. Then, the finished lens having the thickness W of 1.1 mm could be obtained by polishing the second lens base material of the plastic lens without damaging the polarized film. The finished lens having the thickness W of 1.1 mm could be obtained similarly in examples 3 to 4 in which the monomer was changed, in examples 5 to 6 in which the material of the polarized film was changed, and in examples 7 to 12 in which the base curve of the lens was changed. Here, the plastic lens having the distance W1 (examples 2 and 8) can be polishable in the thickness W of 0.6 mm to 0.7 mm or around. However, when the thickness W is less than 1.1 mm, strength of the finished lens is insufficient in some cases, and therefore polishing is ended at 1.1 mm.

Meanwhile, in comparative example 1 and comparative example 3, clearance H was set to 0.2 mm, and therefore monomer could not be flowed uniformly between the first mold and the polarized film, and the plastic lens and the finished lens could not be manufactured. Further, in comparative example 2 and comparative example 4, clearance H was set to 0.8 mm, and therefore thickness W1 of the finished lens was 1.2 mm due to a limit of polishing the prescription surface, which is thicker than the thickness of a normal finished lens. In comparative example 5, the plastic lens was manufactured using the gasket, and therefore it was difficult to absorb the variation of the precision of the curved surface of the polarized film, and the variation was generated in the distance W1 of manufactured ten plastic lenses in a range of 0.5 mm to 1.2 mm. As a result, there is a possibility that the polarized film is damaged, and therefore the second lens base material can not be polished in the thickness W of 0.3 mm to 0.4 mm, and the thickness W of the finished lens was 1.6 mm which is larger than the thickness of the normal finished lens.

DESCRIPTION OF SIGNS AND NUMERALS

14 Polarized film
16 First mold (mold for a first lens base material)
16a Rear surface (concave surface)
18 Second mold (Mold for a second lens base material)
100 Plastic lens (Polarized plastic lens for spectacles)
110 First lens base material
111 Object-side surface
120 Second base material
121 Eyeball-side surface (prescription surface)
T Vertex

The invention claimed is:

1. A method for manufacturing a polarized plastic lens for spectacles, comprising:
applying an adhesive agent to a plurality of places of (i) a peripheral edge portion of a concave surface of a first mold, or (ii) a peripheral edge portion of a polarized film;
bonding the peripheral edge portion of the concave surface and the peripheral edge portion of the polarized film, through the adhesive agent applied to the plurality of places;
forming a cavity between the first mold and a second mold having a convex surface, by disposing the second mold opposite the first mold, the polarized film being sandwiched between the first mold and the second mold, the cavity having a first cavity part and a second cavity part, the first cavity part existing between the first mold and the polarized film, and the second cavity part existing between the second mold and the polarized film; and
forming a plastic lens including the polarized film, between the first mold and the second mold by injecting a plastic material composition into the cavity and thereafter solidifying the injected plastic material composition,
wherein both peripheral edge portions are bonded to each other by applying the adhesive agent thereto, so that a minimum value of a distance between the concave surface and the polarized film is 0.3 mm or more and 0.7 mm or less when bonding them.

2. A method for manufacturing a plastic lens for spectacles, comprising:
applying an adhesive agent to a plurality of places of (i) a peripheral edge portion of a molding surface of a first mold or (ii) a peripheral edge portion of a polarized film;
bonding the peripheral edge portion of the molding surface of the first mold and the peripheral edge portion of the polarized film, through the adhesive agent applied to the plurality of places;
forming a cavity between the first mold and a second mold, by disposing the second mold opposite the first mold, the polarized film being sandwiched between the first mold and the second mold, the cavity having a first cavity part and a second cavity part, the first cavity part existing between the first mold and the polarized film, and the second cavity part existing between the second mold and the polarized film; and
forming a plastic lens including the polarized film, between the first mold and the second mold by injecting a plastic material composition into the cavity and solidifying the injected plastic material composition,
wherein the adhesive agent is applied to the molding surface and the polarized film so that a minimum value of a distance between an object-side surface of the plastic lens and the polarized film is 0.3 mm or more and 0.7 mm or less.

3. The method for manufacturing a polarized plastic lens for spectacles according to claim 2, wherein
the molding surface of the first mold is a concave surface for forming the object-side surface in the plastic lens, and
a molding surface of the second mold is a convex surface for forming an eyeball-side surface in the plastic lens.

4. The method for manufacturing a polarized plastic lens for spectacles according to claim 1, wherein the concave surface is a spherical surface.

5. The method for manufacturing a polarized plastic lens for spectacles according to claim 2, wherein the concave surface is a spherical surface.

6. The method for manufacturing a polarized plastic lens for spectacles according to claim 3, wherein the concave surface is a spherical surface.

7. The method for manufacturing a polarized plastic lens for spectacles according to claim 1, wherein the adhesive agent is applied to the plurality of places so that a part of the peripheral edge portion of the concave surface and a part of the peripheral edge portion of the polarized film are bonded to each other, and the peripheral edge portion of the concave surface and the peripheral edge portion of the polarized film are not bonded to each other at areas between the plurality of places.

8. The method for manufacturing a polarized plastic lens for spectacles according to claim 2, wherein the adhesive agent is applied to the plurality of places so that a part of the peripheral edge portion of the molding surface and a part of the peripheral edge portion of the polarized film are bonded to each other, and the peripheral edge portion of the molding surface and the peripheral edge portion of the polarized film are not bonded to each other at areas between the plurality of places.

* * * * *